(12) United States Patent
Hovis et al.

(10) Patent No.: US 8,347,727 B2
(45) Date of Patent: *Jan. 8, 2013

(54) MULTI-FORMAT, BINARY CODE SYMBOL FOR NON-LINEAR STRAIN MEASUREMENT

(75) Inventors: Gregory Hovis, Martinez, GA (US); William Ranson, Columbia, SC (US); Reginald Vachon, Atlanta, GA (US)

(73) Assignee: Direct Measurements, Inc., Atlanta, GA (US)

( * ) Notice: Subject to any disclaimer, the term of this patent is extended or adjusted under 35 U.S.C. 154(b) by 792 days.

This patent is subject to a terminal disclaimer.

(21) Appl. No.: 12/311,052

(22) PCT Filed: Aug. 16, 2007

(86) PCT No.: PCT/US2007/018045
§ 371 (c)(1),
(2), (4) Date: Aug. 26, 2009

(87) PCT Pub. No.: WO2008/021387
PCT Pub. Date: Feb. 21, 2008

(65) Prior Publication Data
US 2009/0312961 A1    Dec. 17, 2009

Related U.S. Application Data

(60) Provisional application No. 60/838,151, filed on Aug. 17, 2006, provisional application No. 60/838,152, filed on Aug. 17, 2006, provisional application No. 60/838,153, filed on Aug. 17, 2006, provisional application No. 60/838,155, filed on Aug. 17, 2006, provisional application No. 60/838,201, filed on Aug. 17, 2006.

(51) Int. Cl.
G01B 7/16 (2006.01)
(52) U.S. Cl. .......................................... 73/777; 73/760
(58) Field of Classification Search ............ 73/760, 73/777, 800
See application file for complete search history.

(56) References Cited

U.S. PATENT DOCUMENTS

| | | | |
|---|---|---|---|
| 5,612,524 A * | 3/1997 | Sant'Anselmo et al. ..... 235/494 |
| 5,726,435 A | 3/1998 | Hara et al. |
| 5,777,309 A | 7/1998 | Maltsev et al. |
| 5,811,776 A | 9/1998 | Liu |
| 5,862,267 A | 1/1999 | Liu |
| 6,267,296 B1 | 7/2001 | Ooshima et al. |
| 6,802,450 B2 | 10/2004 | Cheung et al. |
| 6,866,199 B1 | 3/2005 | Keech et al. |
| 6,874,370 B1 | 4/2005 | Vachon |

(Continued)

FOREIGN PATENT DOCUMENTS
WO  2005/125020 A1  12/2005

*Primary Examiner* — Max Noori
(74) *Attorney, Agent, or Firm* — Jacobson Holman PLLC

(57) ABSTRACT

A binary code symbol for non-linear strain measurement that can be constructed in any geometric shape having a solid, continuous perimeter containing straight line segments. The symbol includes finder cells to "orient" the symbol in order to associate strain measurements with physical dimensions; and contains encoded data in "data regions" and/or "utility regions." The data and utility regions can be distinct and separate, combined, exclusive (i.e. data regions and no utility regions, or utility regions and no data regions), or omitted. The data "density" can be varied depending upon the application, by varying the number of distinct data or utility cells present in the data regions or utility regions.

25 Claims, 3 Drawing Sheets

U.S. PATENT DOCUMENTS

| | | |
|---|---|---|
| 6,934,013 B2 | 8/2005 | Vachon et al. |
| 7,477,995 B2 * | 1/2009 | Hovis et al. .................... 702/42 |
| 7,533,818 B2 * | 5/2009 | Hovis et al. .............. 235/462.09 |
| 7,878,415 B2 * | 2/2011 | Hovis ........................... 235/494 |
| 2004/0036853 A1 | 2/2004 | Vachon et al. |
| 2006/0173638 A1 | 8/2006 | Hovis et al. |
| 2006/0289652 A1 * | 12/2006 | Hovis et al. .............. 235/462.09 |
| 2011/0049250 A1 * | 3/2011 | Hovis et al. ................... 235/494 |

* cited by examiner

FIG. 1A
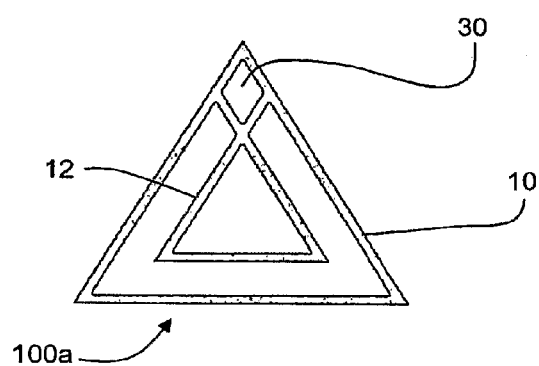
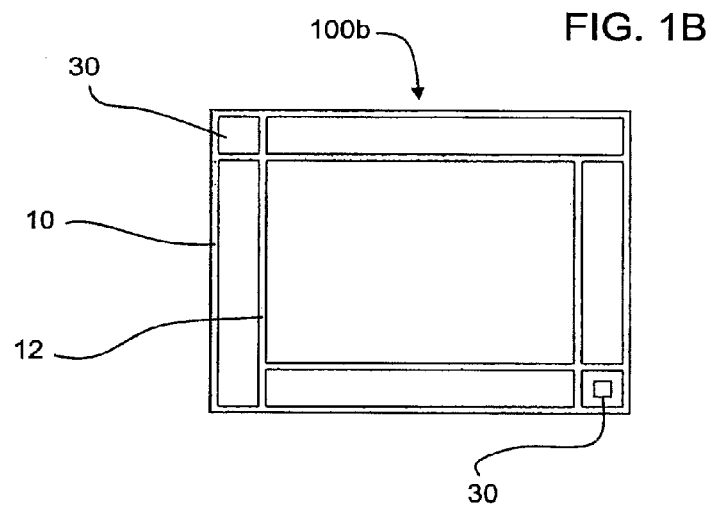
FIG. 1B
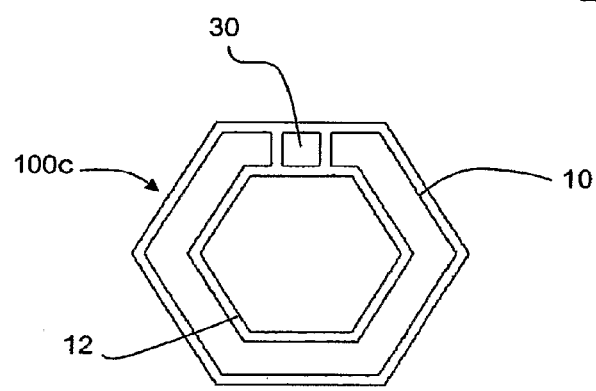
FIG. 1C

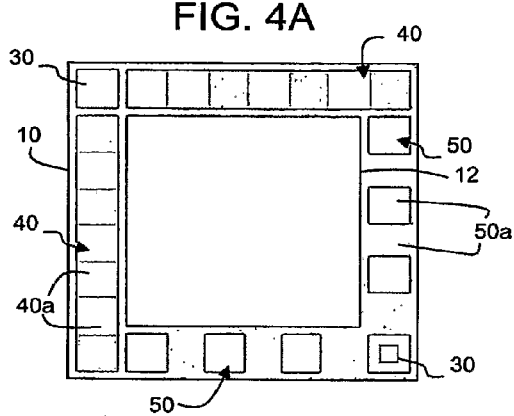
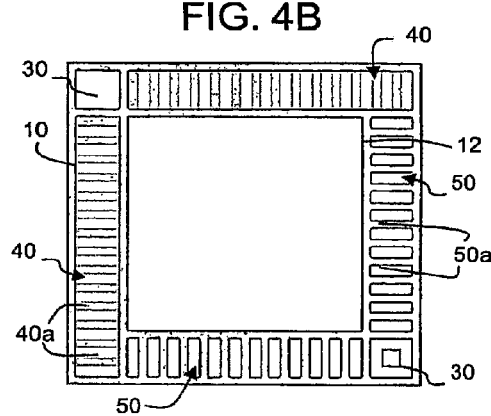
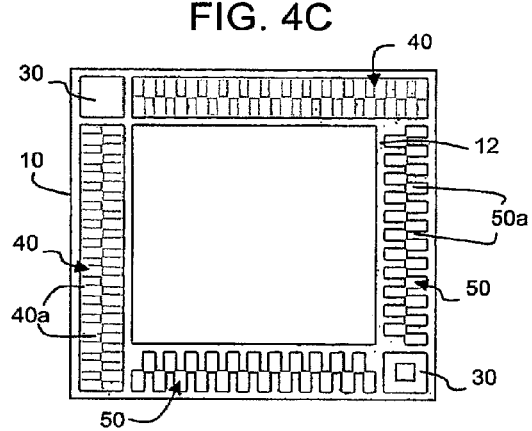
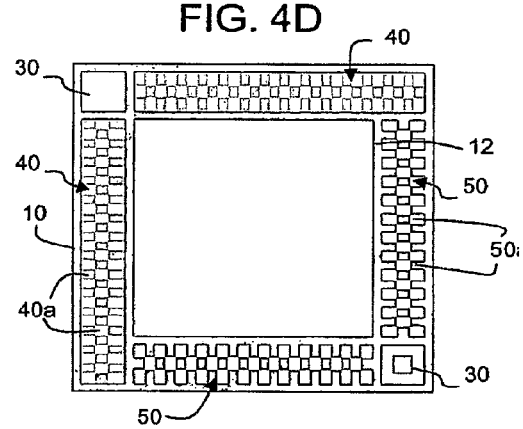
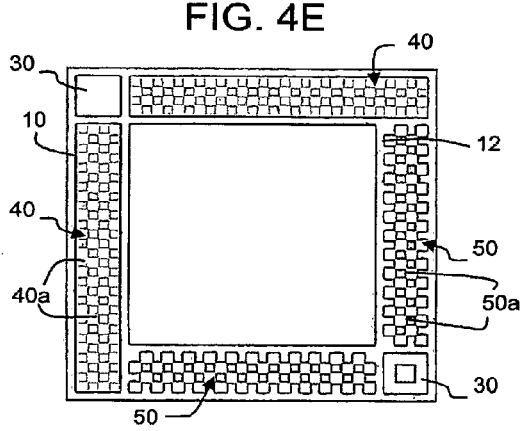

MULTI-FORMAT, BINARY CODE SYMBOL FOR NON-LINEAR STRAIN MEASUREMENT

CROSS-REFERENCE TO RELATED APPLICATIONS

The present patent application is a nationalization of International application No. PCT/US2007/018045, filed Aug. 16, 2007, published in English, which is based on, and claims priority from, U.S. provisional Application No. 60/838,151, 60/838,152, 60/838,153, 60/838,155, and 60/838,201, all filed Aug. 17, 2006, all of which are incorporated herein by reference in their entireties.

BACKGROUND OF THE INVENTION

1. Field of the Invention

The present invention relates to a binary code symbol for non-linear strain measurement. More specifically, the invention relates to an improvement of the binary code symbol for non-linear strain measurement that is the subject of co-pending U.S. Published Application No. 2006-0289652-A1 (application Ser. No. 11/167,558, filed Jun. 28, 2005) for "Binary Code Symbol for Non-Linear Strain Measurement and Apparatus and an improvement of Method for Analyzing and Measuring Strain"; and in particular, additional examples of binary code symbol formats that can encode a range of data values using an error-correcting code (ECC) technique.

2. Related Art

There are numerous one-dimensional (1D) and two-dimensional (2D) symbols in use today, and most utilize a majority of the symbol's surface area to store the encoded information. These symbols are typically comprised of large, distinguishable blocks, dots, or bars called "cells" that enable data encoding. The spacing, relative size, state (i.e. black or white), or some combination of cell attributes is exploited to encode and decode data. These types of symbols are designed for inexpensive, low-resolution reading devices (or sensors); therefore cell dimensions can be relatively large with respect to the overall symbol size.

While many applications require that a symbol's encoded information be "read," there are additional applications that warrant a detailed accounting of the symbol's spatial characteristics. Metrology is one such application, which involves making precise geometric measurements of the symbol's features. Symbols optimized for "reading" purposes are not necessarily, nor are they normally, optimized for "metrology" purposes.

Examples of common symbols are a UPC symbol, a Data Matrix symbol, and a MaxiCode symbol, which are shown in FIGS. 1A-1C of U.S. application Ser. No. 11/167,558, the disclosure of which is incorporated herein by reference in its entirety. As shown in FIGS. 1A-1C of U.S. Published Application No. 2006-0289652-A1, typical 1D and 2D symbols utilize cell arrangements that result in a broken (or non-continuous) symbol perimeter. Additionally, each has cells that are distributed somewhat uniformly across the entire symbol area. These characteristics are an efficient use of the symbol's surface area as a data encoder/decoder, but can cause a reduction in accuracy for certain types of deformation analyses, e.g. strain measurement.

Sensor resolution for machine-enabled metrology is typically higher than the sensor resolution required to simply encode and decode symbol information. Therefore with high-resolution sensors, it is possible to relax some of the "reader" requirements placed on existing symbol design, and produce symbols specifically for deformation/strain measurement.

It is to the solution of these and other problems that the present invention is directed.

SUMMARY OF THE INVENTION

It is accordingly a primary object of the present invention to provide a binary code symbol for non-linear strain measurement having a unique geometry and attributes.

It is another object of the present invention to provide a binary code symbol for non-linear strain measurement having features that enhance deformation and strain measurement.

It is still another object of the present invention to provide a binary code symbol for non-linear strain measurement that is designed specifically for perimeter-based deformation and strain analysis.

It is still another object of the present invention to provide a perimeter strain analysis method for use with a binary code symbol for non-linear strain measurement.

It is still another object of the present invention to provide a binary code symbol for non-linear strain measurement with near-perimeter data encoding.

It is another object of the present invention to provide a binary code symbol for non-linear strain measurement that can encode a range of data values using an error-correcting code ("ECC") technique.

These and other objects of the invention are achieved by the provision of a binary code symbol for non-linear strain measurement that can be constructed in any geometric shape having a perimeter constructed of line segments. "Line segment" is used herein to designate a part of a line that is bounded by two end points, and that can be straight or curved and can be continuous or include discontinuities. Examples of geometric shapes composed of straight line segments include, but are not limited to, three-, four-, and six-sided shapes.

The symbol includes one or more finder cells to "orient" the symbol in order to associate strain measurements with physical dimensions; and contains encoded data in "data regions" and/or "utility regions."

The data and utility regions can be distinct and separate, combined, exclusive (i.e. data regions and no utility regions, or utility regions and no data regions), or omitted.

The data "density" of the symbol can be varied depending upon the application, by varying the number of distinct data or utility cells present in the data regions or utility regions.

A non-linear strain gage in accordance with the invention comprises a target associated with an object for which at least one of strain and fatigue damage is to be measured, sensor means for pre-processing a detectable physical quantity emitted by the target and output data representing the physical quantity, the sensor means being compatible with the detectable physical quantity, means for analyzing the data output by the sensor means to define the binary code symbol, and means for measuring the strain on the object directly based on the pre-processed and analyzed data, wherein the target comprises the binary code symbols in accordance with the present invention.

In another aspect of the invention, the non-linear strain gage further comprises means for utilizing the strain measurement to provide information on at least one of fatigue damage and strain hysteresis for materials of known and unknown mechanical properties.

In a method of measuring strain on an object directly, in accordance with the present invention, the binary code symbol is associated with an object in such a way that deformation of the binary code symbol and deformation under load of the object bear a one-to-one relationship, wherein the binary code symbol emits a detectable physical quantity. The changes in the binary code symbol are identified as a function of time and change in the load applied to the object. The changes in the binary code symbol is then into a direct measurement of strain.

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIGS. 1A-1C illustrate examples of different shapes of a binary code symbol in accordance with the present invention.

FIGS. 4A-4E illustrate examples of data densities for a binary code symbol in accordance with the present invention having a shape as shown in FIG. 1B.

DETAILED DESCRIPTION OF THE PREFERRED EMBODIMENTS

Figure 2A:
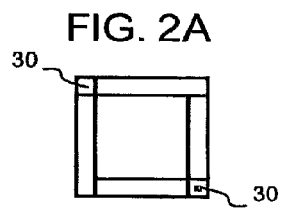
FIGS. 2A-2F illustrate examples of finder cell arrangements for a binary code symbol in accordance with the present invention having a shape as shown in FIG. 1B.
Figure 2B:
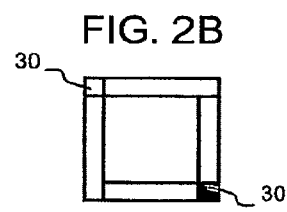
Figure 2C:
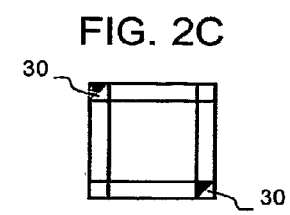
Figure 2D:
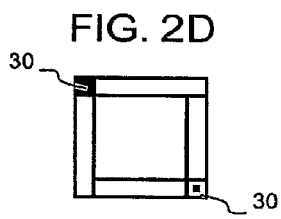
Figure 2E:
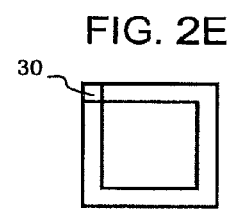
Figure 2F:
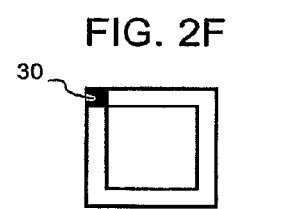

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

A binary code symbol for non-linear strain measurement in accordance with the present invention is designed specifically for perimeter-based deformation and strain analysis, while providing for robust, self-checking/self-correcting data encoding. Specific geometric features of the symbol are optimized for perimeter-based, non-linear strain measurement using discrete or analog deformation analysis methods.

The invention relates to an improvement of the binary code symbol for non-linear strain measurement that is the subject of U.S. Published Application No. 2006-0289652-A1 for "Binary Code Symbol for Non-Linear Strain Measurement and Apparatus and Method for Analyzing and Measuring Strain" and as described in U.S. Pat. No. 6,934,013 B2 for "Compressed Symbology Strain Gage." In particular, the present invention provides additional examples of binary code symbol formats.

The binary code symbol can be constructed in any geometric shape having an outer perimeter constructed of line segments, and enables data encoding near the symbol's perimeter. This unique combination of attributes significantly increases both the quantity and quality of distantly-spaced symbol features. These unique characteristics enable high-accuracy deformation analysis using discrete or analog techniques. Data is encoded in proportionately smaller regions of the symbol (compared to current symbols); therefore a higher resolution sensor is required to read and analyze the symbol.

In addition to the outer perimeter, the binary code symbol also can have an inner perimeter, which is constructed of line segments, although in general an inner perimeter is not required. The inner perimeter can be an enlargement of the outer perimeter having a fractional scale factor greater than 0 and less than 1; that is, it can be the same as the outer perimeter, but smaller, but this is not a requirement. Also, the inner and outer perimeters can be concentric, but this also is not a requirement. Further, it is not a requirement that the inner and outer perimeters have the same shape or be constructed in the same fashion.

Examples of first, second, and third binary code symbol shapes 100a, 100b, and 100c are shown respectively in FIGS. 1A-1C, each having an outer perimeter 10 and an inner perimeter 20. Although FIGS. 1A-1C show regular polygons having three, four, and six sides, respectively, the binary code symbol can have a perimeter constructed from any number of line segments, and need not be a polygon.

The binary code symbol includes at least one distinct feature 30 to "orient" it, in order to associate strain measurements with physical dimensions. Such features are referred to as "finder cells." Using the "rectangular" shape 100b shown in FIG. 1B, several examples of finder cell arrangements are shown in FIGS. 2A-2F. Similar finder-cell arrangements can be constructed for any binary code symbol geometric shape. At least one finder cell 30 is required to determine the orientation of the binary code symbol, and two or more can be utilized for redundancy and to enable robust algorithms to determine symbol orientation.

The binary code symbol contains encoded data in "data regions" 40 and may also contain encoded data in "utility regions" 50. As shown in FIGS. 4A-4E, each data region 40 is made up of any number of data cells 40a, and as shown in FIGS. 4C-4E, can contain multiple rows 40b of data cells 40a. Also as shown in FIGS. 4A-4E, if present, the utility regions are made up of utility cells 50a with alternating appearance (i.e. foreground, background, foreground, etc.). There are no restrictions placed on cell foreground and background appearance except that sufficient contrast is provided to enable a sensor to determine cell state.

The utility regions 50 assist in symbol location, orientation, and analysis. In addition, the utility regions 50 can contain multiple rows 50b of utility cells 50a, as shown in FIGS. 4C-4E, which can be used to store auxiliary information and/or codes (e.g. vendor ID, application ID, function ID, version information, date/time, materials ID/info, etc.)

Figure 3A:
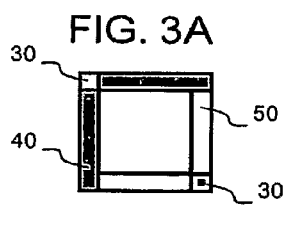
FIGS. 3A-3F illustrate examples of data region and/or utility region arrangements for a binary code symbol in accordance with the present invention having a shape as shown in FIG. 1B.
Figure 3B:
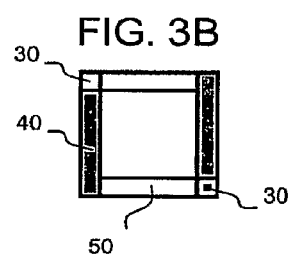
Figure 3C:
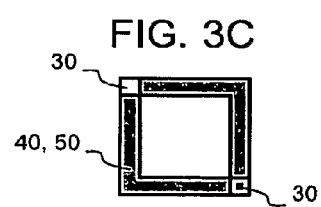
Figure 3D:
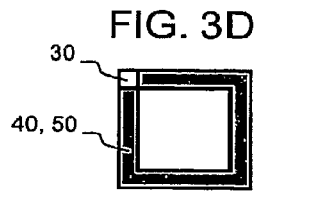

Using just the "rectangular" shape 100b shown in FIG. 1B, several examples of data/utility region arrangement are shown in FIGS. 3A-3F. The data and utility regions 40 and 50 can be distinct and separate (FIGS. 3A and 3B), combined (FIGS. 3C and 3D), exclusive (i.e. data regions and no utility regions (FIGS. 3C and 3D), or omitted (FIGS. 3E and 3F): More specifically, FIGS. 3A and 3B show data regions 40 and utility regions 50 designated by different shades of gray, as a result of which, the data regions 40 and the utility regions 50 are separate and distinct. It does not matter which region is shaded which color, as the regions are interchangeable. FIGS. 3C and 3D show all regions 40 and 50 shaded a single color, as a result of which the data and utility regions 40 and 50 are combined. The combined data and utility regions 40 and 50 can encode all data, all utility, or some combination within the cell rows as shown in FIGS. 4A-4E. With respect to FIGS. 3E and 3F, in which the data and utility regions are omitted, the perimeter analysis for non-linear strain measurement does not require that data or utility regions be present.

Similar arrangements of data and/or utility regions can be constructed for any binary code symbol geometric shape.

Various finder-cell arrangements can also be used in combination with different data region and/or utility region arrangements.

For a binary code symbol containing at least one of one or more data region and one or more utility regions, the data "density" can also be varied depending upon the application. The density depends upon the number of distinct data or utility cells respectively present in the data regions or the utility regions. As disclosed in U.S. provisional application No. 60/838,153, refinement of the marking process can be used to increase the density of the data. More specifically, the cells must have well defined (not fuzzy) edges, and as the imaging lens magnifies the image and the edges, the selection of the marking process affects the quality of the edges. If a short wave length laser is used for marking, as compared to a long wave laser, the definition and quality for the edge can be refined and smaller cells can be produced.

Using just the "rectangular" shape shown in FIG. 1B, several examples of data density are shown in FIGS. 4A-4E. The data density can be can be varied by changing the width of distinct data or utility cells respectively present in the data regions or the utility regions, and/or by changing the number of distinct data or utility cells respectively present in the data regions or the utility regions. Although data densities of 4, 28, 56, 84, and 112 data cells are shown (in FIGS. 4A-4E, respectively), a binary code symbol can be constructed of any number of data cells. Similar data densities can be constructed for any binary code symbol geometric shape. The examples in FIGS. 4A-4E show regions with equal numbers of cells; however this is not a requirement, and different regions may contain different numbers of cells.

Various finder-cell arrangements can also be used in combination with different data cell arrangements and data densities. Additional high-density configurations are described in our co-pending U.S. provisional application No. 60/838,151, filed Aug. 17, 2006 and entitled "High Density Binary Code Symbol," the disclosure of which is incorporated herein in its entirety.

Inner and outer quiet regions are designated whereby the data regions, the utility regions, and the finder cells can be distinguished from their background As disclosed in U.S. Published Application No. 2006-0289652-A1, in a binary code symbol in accordance with the present invention, information can be encoded via the symbol's data cells. An individual data cell represents a single bit of information; that is, its state is either "on" or "off" (i.e. "1" or "0"). The order and state of individual bit values combine to represent an encoded data value. The binary contribution of a single data cell is indicated by the cell's state, which is determined by a sensor. Data cells that have the same appearance as the symbol's background (or quiet region) are considered "on" or bit value "1." Data cells that have the same appearance as the foreground (or perimeter) are considered "off" or bit value "0."

It is desirable that encoded data be somewhat "self correcting" in the event that part of the symbol is damaged, scratched, or otherwise degraded. Therefore, the binary data in each data region of the symbol is encoded using an error-correcting code (ECC) algorithm. The ECC algorithm combines vector-space mathematics and set theory to convert numeric quantities into encoded values that provide limited self-checking and self-correcting capability during decoding. The use of ECC algorithms plus data redundancy provides for robust encoding and limited protection against data loss.

The ECC algorithm used is a Hamming 7-4 technique. This encoding method takes the original data value (un-encoded) and breaks it into 4-bit "words." Each 4-bit word is encoded into a 7-bit word containing the original value and three "check bits." This method permits the original 4-bit word to be recovered in the event that the sensor cannot determine the state of one of the 7-bit word's bits. Therefore, the original data value can be recovered if up to one bit in each word is lost.

The Hamming technique used has an encoding "efficiency" of 0.571. This is calculated as the ratio of the number of original bits ($N_1$) to the number of encoded bits ($N_2$). For the example in FIG. 3, $N_1$=16 and $N_2$=28, giving:

$$E = \frac{N_1}{N_2} = \frac{16}{28} = 0.571$$

Therefore the data capacity (or number of unique combinations of data values) for a single data region in a symbol that uses ECC encoding, expressed in terms of the number of data cells per region ($N_2$) is roughly:

$$C = 2^{N_2 \cdot E}$$

The symbol is specifically designed to enable high-accuracy deformation analysis. The symbol's solid perimeter and perimeter-encoding technique are unique attributes that significantly increase both the quantity and quality of distantly-spaced symbol features. These qualities improve the accuracy of deformation analyses using discrete or analog machine-enabled techniques.

The multi-format, binary code symbol in accordance with the present invention can be used as the target of a non-linear strain gage for measuring the strain on an object under load, as described in U.S. Published Application No. 2006-0289652-A1. A non-linear strain gage employing the high density, rectangular, binary code symbol as a target also uses a computer to implement the same theory, algorithms, and computer programs as described in U.S. Published Application No. 2006-0289652-A1, which (1) identify the binary code symbols and the changes therein as a function of time and change in the load, (2) translate the changes in the binary code symbols into strain, and (3) display it in a suitable format.

Figure 3E:
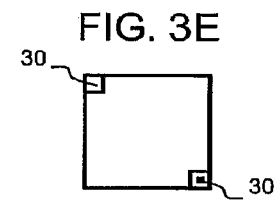
Figure 3F:
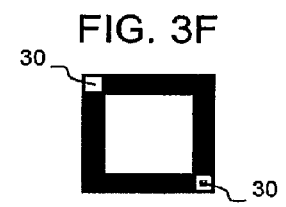

The perimeter analysis for non-linear strain measurement does not require that data or utility regions be present. Therefore, symbols as described above in which the data and utility regions are exclusive (i.e. data regions and no utility regions as shown in FIGS. 3C and 3D, or utility regions and no data regions, or omitted (as shown in FIGS. 3E and 3F) can be used as targets for non-linear strain measurement.

The binary code symbol in accordance with the present invention can be used as the target of a non-linear strain gage for measuring the strain on an object under load, as described in U.S. Published Application No. 2006-0289652-A1. Deformation analysis of the symbol's spatial characteristics and strain measurement can be carried out as disclosed in U.S. Published Application No. 2006-0289652-A1, using the methods, algorithms, and apparatus as disclosed therein.

A non-linear strain gage employing the binary code symbol as a target also uses the same computer programs as described in U.S. Published Application No. 2006-0289652-A1, which (1) identify the binary code symbols and the changes therein as a function of time and change in the load, (2) translate the changes in the binary code symbols into strain, and (3) display it in a suitable format.

It is to be understood that the present invention is not limited to the illustrated user interfaces or to the order of the user interfaces described herein. Various types and styles of user interfaces may be used in accordance with the present invention without limitation.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A target for association with an object for which at least one of strain and fatigue damage is to be measured, the target incorporating a binary code symbol for perimeter-based, non-linear strain measurement using discrete or analog deformation analysis methods, the binary code symbol emitting a detectable physical quantity and including:
    an outer perimeter constructed of line segments,
    orienting means for determining the orientation of the binary code symbol, in order to associate strain measurements with physical dimensions, wherein the orienting means is bounded at least in part by the outer perimeter, and
    inner and outer quiet regions for distinguishing the orienting means from its background.

2. The target of claim 1, wherein the orienting means of the binary code symbol comprises at least one distinct feature.

3. The target of claim 2, wherein the at least one distinct feature of the binary code symbol is a finder cell.

4. The target of claim 1, wherein the orienting means of the binary code symbol comprises at least two distinct features to provide redundancy and to enable robust algorithms to determine symbol orientation.

5. The target of claim 1, wherein the binary code symbol further includes an inner perimeter constructed of line segments.

6. The target of claim 5, wherein the inner perimeter of the binary code symbol is an enlargement of the outer perimeter having a fractional scale factor greater than 0 and less than 1.

7. The target of claim 5, wherein the inner and outer perimeters of the binary code symbol are concentric.

8. The target of claim 5, wherein the inner and outer perimeters of the binary code symbol have different shapes.

9. The target of claim 1, wherein the outer perimeter of the binary code symbol is a polygon.

10. The target of claim 1, wherein the binary code symbol further includes at least one data region containing encoded data region data, wherein the at least one data region is bounded at least in part by the outer perimeter, and wherein the inner and outer quiet regions further distinguish the at least one data region from its background.

11. The target of claim 10, wherein the binary code symbol further includes an inner perimeter constructed of line segments, wherein the at least one data region is bounded at least in part by the inner perimeter.

12. The target of claim 10, wherein the at least one data region of the binary code symbol comprises a plurality of data cells, and the encoded data region data is encoded in the data cells.

13. The target of claim 12, wherein the density of the data region data of the binary code symbol is determined by one of the number and width of the data cells.

14. The target of claim 12, wherein the at least one data region of the binary code symbol contains multiple rows of data cells.

15. The target of claim 10, wherein the binary code symbol further includes at least one utility region containing encoded utility data, wherein the at least one utility region is bounded at least in part by the outer perimeter, and wherein the inner and outer quiet regions of the binary code symbol further distinguish the at least one utility region from its background.

16. The target of claim 15, wherein the binary code symbol further includes an inner perimeter constructed of line segments, wherein the at least one utility region of the binary code symbol is bounded at least in part by the inner perimeter.

17. The target of claim 15, wherein the at least one utility region of the binary code symbol comprise a plurality of utility cells with alternating appearance, and the utility data is encoded in the utility cells.

18. The target of claim 17, wherein the density of the utility data is determined by one of the number and width of utility cells.

19. The target of claim 15, wherein the at least one utility region of the binary code symbol contains multiple rows of utility cells.

20. The target of claim 19, wherein the multiple rows of encoded utility data store at least one of auxiliary information and codes.

21. The target of claim 15, wherein the at least one data region and the at least one utility region of the binary code symbol are distinct and separate.

22. The target of claim 15, wherein the at least one data region and the at least one utility region of the binary code symbol are combined.

23. The target of claim 22, wherein the combined data and utility regions encode one of all data region data, all utility data, and a combination of data region data and utility data.

24. A non-linear strain gage comprising:
    the target in accordance with claim 1, associated with an object for which at least one of strain and fatigue damage is to be measured,
    sensor means for pre-processing the detectable physical quantity emitted by the target and output data representing the physical quantity, the sensor means being compatible with the detectable physical quantity; and
    a computer including:
        means for analyzing the data output by the sensor means to define the binary code symbol; and
        means for measuring the strain on the object directly based on the pre-processed and analyzed data.

25. A method of measuring strain on an object directly, using the non-linear strain gage in accordance with claim 24, comprising the steps of:
    associating the target with an object in such a way that deformation of the binary code symbol and deformation under load of the object bear a one-to-one relationship;
    identifying the changes in the binary code symbol as a function of time and change in the load applied to the object, using the computer; and
    translating the changes in the binary code symbol into a direct measurement of strain, using the computer.

* * * * *